United States Patent [19]

Lehmann, Jr. Ernst

[11] 4,323,030
[45] Apr. 6, 1982

[54] SPRAY COATING DEVICE

[76] Inventor: Ernst, Lehmann, Jr.
Boppartshofstrasse 35, CH-9014 St. Gall, Switzerland

[21] Appl. No.: 160,680

[22] Filed: Jun. 18, 1980

[30] Foreign Application Priority Data

Jun. 28, 1979 [DE] Fed. Rep. of Germany ....... 2926040

[51] Int. Cl.³ ............................................ B05L 15/00
[52] U.S. Cl. .................................. 118/309; 118/323; 118/326; 118/DIG. 7
[58] Field of Search ......... 118/634, 326, 323, DIG. 7, 118/309, 324; 98/115 SB

[56] References Cited

U.S. PATENT DOCUMENTS

| | | | |
|---|---|---|---|
| 3,201,272 | 8/1965 | Forshee | 118/326 X |
| 3,870,016 | 3/1975 | Schneider | 118/326 X |
| 3,902,455 | 9/1975 | Lehmann et al. | 118/DIG. 7 |
| 3,942,420 | 3/1976 | Marino | 118/326 X |
| 4,153,008 | 5/1979 | Marino et al. | 118/634 |

FOREIGN PATENT DOCUMENTS 828032 of 1949 Fed. Rep. of Germany .
2134775 of 1971 Fed. Rep. of Germany .
2704497 of 1978 Fed. Rep. of Germany .

Primary Examiner—John P. McIntosh
Attorney, Agent, or Firm—Ostrolenk, Faber, Gerb & Soffen

[57] ABSTRACT

The disclosure concerns a spray coating device for spray coating an article with particulate material in a coating chamber. In connection with a change of coating material, e.g. a color change, it is desirable to remove the previous coating material from the coating chamber. To this end, the inner walls of the coating chamber are defined by movable endless belts whose inner courses move to deliver coating material that has accumulated thereon to the floor of the chamber. The floor of the chamber is also comprised of an endless belt that moves the coating material out of the chamber. The roof of the chamber is also comprised of an endless belt which moves the coating material to one of the side walls. The belts may be cleaned by various devices such as a brush, gas blast nozzles and/or a suction device. Slots defined in the walls permit introduction of the article to be sprayed and the spraying device into the chamber. Plastic elements limit the size of the slot through which the spraying device passes.

30 Claims, 7 Drawing Figures

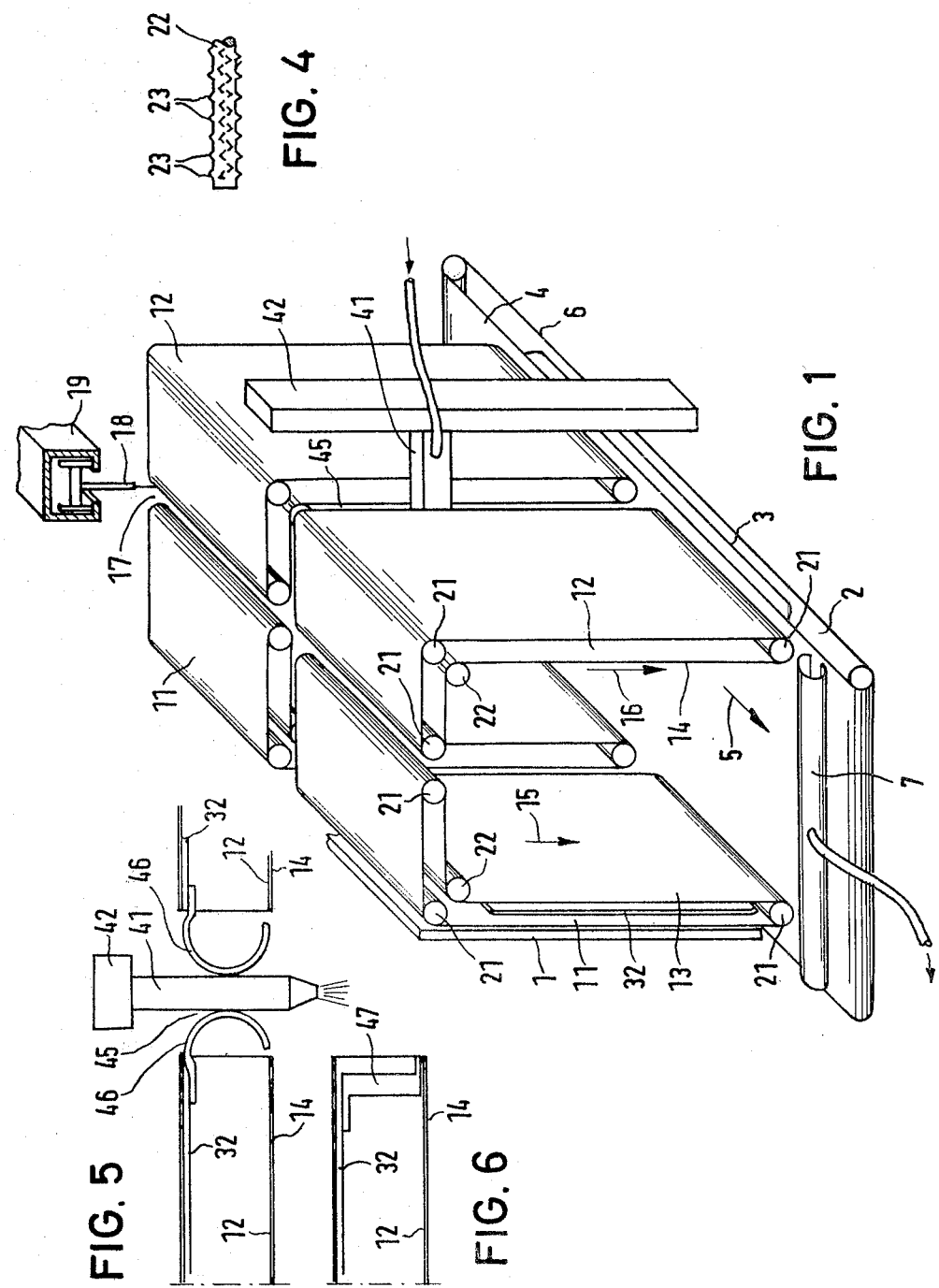

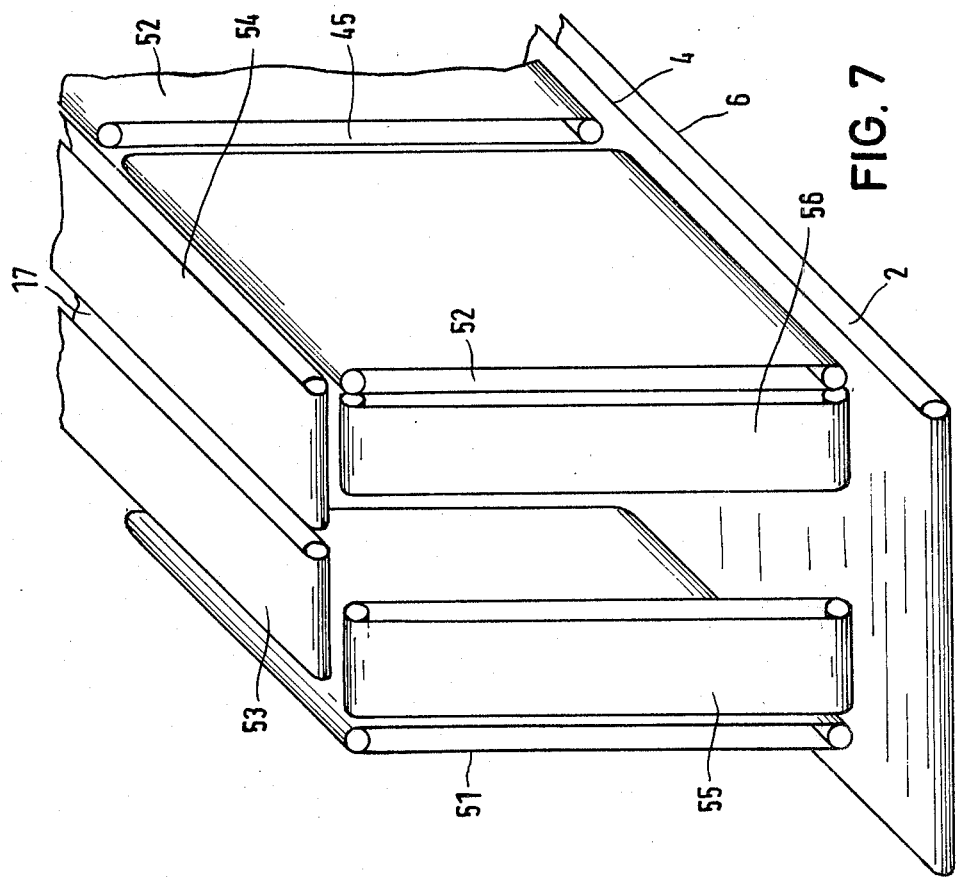
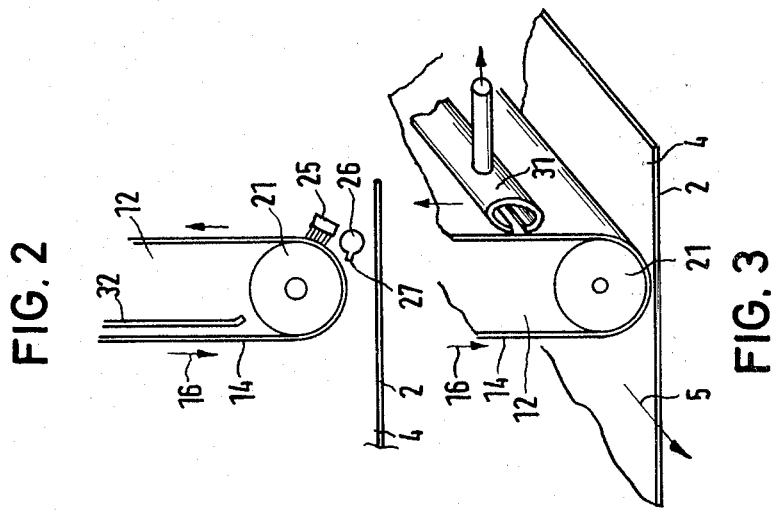

SPRAY COATING DEVICE

BACKGROUND OF THE INVENTION

The present invention relates to a spray coating device for spraying pulverulent to granular consistency particulate coating material and particularly to means for removing from the coating chamber the coating material which accumulates on the walls of the chamber.

The spray coating device includes a coating chamber to receive the articles to be coated. An article spraying device is directed into the interior of the coating chamber. The chamber has a discharge device for excess coating material which accumulates on the floor of the chamber comprising at least one driven endless belt to take up accumulated coating material.

During spray coating of articles, a portion of the coating material is sprayed past the article or bounces off it. This material need not be lost. Instead, it can be recovered by means of suitable filtering and treating devices. Upon a change in the coating material, particularly a change from one color to another color, all traces of the previous coating material must be removed before spraying begins with a new material. Otherwise, coating defects, and particularly color defects, may result. Cleaning during the change of the coating material results in undesired stopping or down times. When the coating is being done with powder, as little powder as possible should be present at any time in the chamber since large accumulations of powder may, in case of subsequent eddying, form an ignitable air-powder mixture.

Various attempts at solving these difficulties have already been made.

(a) A movable belt may form the floor of the coating chamber. U.S. Pat. No. 3,252,401 discloses a moving endless belt, which forms the floor of the coating chamber, and describes the floors as receiving the falling excess powder. The endless belt moves between rolls and unwinds from one roll and is wound up on another roll. Thereafter, the belt is either thrown away or is cleaned for reuse. An endless rotating filter belt used as the floor of the chamber is shown in German Pat. No. 2,430,517, which corresponds to U.S. Pat. No. 3,902,455. In the coating chamber here, a special cleaning device is provided which draws all powder particles of a given color from the filter floor. Subjecting such a filter belt to suction both below and above the powder-covered section of the belt is known from German Auslegeschrift No. 2,546,920, which corresponds to U.S. Pat. No. 3,918,641. The use of an endless impervious conveyor belt for removing powder from the chamber is known from German Offenlegungsschrift No. 2,153,395. All of these systems, however, have the disadvantage that the walls and roof of the coating chamber must still be cleaned by hand.

(b) With relatively open coating chambers, a wall is placed behind the articles to be coated. The wall has the form of a moving belt that intercepts the powder particles which are sprayed past the article. In U.S. Pat. No. 2,232,561, the belt is an endless complicated link chain, the lower end of which travels through a cleaning bath. In U.S. Pat. No. 3,744,450, there is an endless rotating belt which is arranged as the powder collection wall behind the article to be coated. This belt must be replaced upon each color change from a powder of one color to a different powder of a different color. In U.S. Pat. Nos. 2,841,073 and 2,875,680, the wall is a downwardly traveling endless belt, which must be replaced when it has run off from the feed roll.

(c) If stationary coating chamber walls are provided with air passage openings, as proposed in Swiss Pat. Nos. 560,558 and 581,503, the chamber walls will remain clean. However, this has the disadvantage that the scavenging air which enters through the walls combines with the powder-air mixture in the coating chamber and thus reduces the coating effectiveness of the chamber. The incoming scavenging air dilutes the cloud of coating powder. Furthermore, the scavenging air results in eddying and depositing of powder in "dead" corners. Finally, a large amount of scavenging air and thus also a high consumption of energy are necessary.

(d) One solution calls for cleaning the chamber walls. Although this is technically simple, it is cumbersome in practice. As shown in German Gebrauchsmuster No. 78 22 478, the process comprises hanging replaceable walls which are changed upon a change in color or powder in the coating chamber.

(e) German Offlegungsschrift No. 2,132,946 shows an endless, air-pervious belt, which extends over the length of the coating chamber and travels endlessly in the chamber transverse to the chamber over the floor, the two side walls and the roof. Below this endless belt, there is a conveyor belt for removing excess powder from the chamber. The endless belt which forms the inner chamber walls does not transport any powder out of the chamber but serves to produce an eddying of powder within the chamber.

(f) U.S. Pat. No. 2,509,276 shows a coating chamber through which a web of articles to be coated passes between an electrically grounded chamber roof and endlessly rotating, driven, high-voltage electrodes. The high-voltage electrodes are located within a U-shaped loop, which is open toward the top of an endless rotating grounded grid electrode. The coating of the bottom side of the web of material is effected by a spray device which is arranged between the high voltage electrodes and the grid electrode on the one hand and the web of goods on the other hand. The electric field of the high-voltage electrodes causes the coating material to be attracted by the grounded parts. Therefore, the greater part of the coated material is attracted by the web of goods, as a result of the grounded roof of the chamber, and the excess by the grid electrode. From this, the coating material adhering to it is removed at the lower end of the chamber by brushes and scrapers.

SUMMARY OF THE INVENTION

The object of the present invention is to make it possible, with minimal time loss for cleaning work, to successively coat an article with different coating materials and without coating defects, particularly color defects, or disadvantageous concentrations of material or flows in the coating chamber. Furthermore, the apparatus should be simple and of low price.

This object is achieved in accordance with the invention in that all inner walls of the chamber, on which coating material may accumulate, are formed or covered by downwardly extending, downwardly moving courses of drivable endless belts, which discharge the coating material that has accumulated on them to a discharge device at the bottom of the chamber. The spray device is arranged so that it sprays the coating material onto articles present in the space between the downwardly extending courses of the belt.

In this way, the walls of the chamber are kept clean. Changes in the coating material can be effected without cleaning work and therefore without loss of time. There are neither accumulations of material which are difficult to remove nor explosive nor detrimental flows of coating material or air in the coating chamber. Electrodes may, but need not, be present in order to act on the excess coating material.

Other objects and features of the invention are described below with reference to the drawings.

BRIEF DESCRIPTION OF THE DRAWINGS

FIG. 1 is a diagrammatic perspective view of a coating device for particulate coating material in accordance with the invention, FIG. 2 shows a detail of FIG. 1 on a larger scale, FIG. 3 shows a variant of the detail of FIG. 2, in perspective, FIG. 4 shows a guide roller for an endless belt for FIG. 1, FIG. 5 shows the position of a spray device from FIG. 1 between two belts of the chamber, FIG. 6 shows a variant of FIG. 5, FIG. 7 is a perspective view of another embodiment of the invention.

DESCRIPTION OF THE PREFERRED EMBODIMENTS

In FIG. 1, the side walls 1 of a coating chamber of a coating device are shown diagrammatically. The floor of the chamber is defined by a driven endless filter belt 2. Between the upper and lower courses of the filter belt 2, there is a pan 3 which is connected to a source of vacuum, not shown. The partial vacuum of the pan 3 firmly holds fallen powder on the upper course 4 of the filter belt 2. The upper course 4 moves in the direction indicated by the arrow 5 while the lower course 6 of the belt moves in the opposite direction. At the downstream end of the upper course 4 of the belt, there is a suction device 7 for drawing off the powder present on the filter belt 2. Elements 2-7 are component parts of a powder discharge device for the floor of the chamber, such as those shown in German Pat. No. 2,430,517, which corresponds to U.S. Pat. No. 3,902,455 and in German Auslegeschrift No. 2,546,920, which corresponds to U.S. Pat. No. 3,918,641.

The longitudinal side walls and the roof of the coating chamber, at least on the inside of the chamber, comprise opposed, parallel driven endless belts 11 and 12 arranged along opposite edges of the belt 2. The belts 11 and 12 are preferably filter belts so that the passage of air through them is possible. The belts 11 and 12 are deflected at an angle near the top portions of their runs for defining a roof for the chamber at the top of their runs and for defining the sides of the chamber. The belts 11 and 12 are driven so that the opposed belt courses 13 and 14, respectively, which form the inside walls of the chamber, move outwardly at the roof of the chamber and downwardly along the chamber side walls in the directions indicated by the arrows 15 and 16, respectively. The belts 2, 11 and 12 can be driven continuously or intermittently. In the roof, between the two belts 11 and 12, there is a slot-shaped space 17, through which the suspension devices of a transport device 19 for the articles to be coated can travel.

The belts 11 and 12 travel over belt guide rollers 21 arranged within the loops of the belts at space 17 and at the corner around which the belts bend. The belts travel over guide rollers 22 which are arranged within the chamber at the corner about which the belts bend. The guide rollers have a surface contour, for instance, local elevations 23, shown in FIG. 4, so that squeezing and compressing of powder between the guide rollers 22 and the belts 11 and 12 is avoided. In another embodiment (not shown), the guide rollers have a smooth cylindrical surface, which is provided with recesses and with relatively narrow arms between the recesses.

A cleaning device for the belts 11 and 12 comprises brushes 25 arranged in the region of the lower guide rollers 21 and nearby pressure-gas blast devices 26. The nozzles 27 of the blast devices 26 are directed so that their blast impinges upon the belts 11 and 12 at an angle of less than 45°, and preferably at an angle of between 5° and 12°. The impingement is at the support roller for the endless belt and is about at the exit of the inner course of the belt from the chamber. The gas blast produces a vacuum region, corresponding to the Coanda effect, between the incoming jet of pressure gas and the wall. The suction produced by this vacuum region draws colored particles out of the belts 11 and 12. The powder which has been removed from the belts 11 and 12 deposits on the filter belt 2 on the floor of the chamber and is removed from there in accordance with the aforementioned German Pat. No. 2,430,517, corresponding to U.S. Pat. No. 3,902,455. After suitable treatment, the removed deposits may be returned to the powder circuit.

A variant of the means for cleaning the belts 11 and 12 is shown in FIG. 3. In this case, a suction device 31 for removing powder is arranged near the lower guide roller 21 on both belts 11 and 12. The powder which is thereby removed may also be returned after suitable cleaning to the powder circuit, in accordance with the aforementioned German Auslegeschrift No. 5,546,920, corresponding to U.S. Pat. No. 3,918,641.

As shown in FIGS. 1 and 2, grounded metal plates 32 are present within the loops of the belts 11 and 12. These plates are intended to prevent electric fields, produced during the spray coating, from acting toward the outside.

The spray device is normally in the form of a gun. A problem is presented by the chamber slots through which the spray device 41 is introduced into the booth. Usually, the spray device 41 is moved up and down by means of a lift mechanism 42 in order to achieve uniform coating of an object in the chamber. This problem is solved by providing a plurality of sets of the belts 11 and 12, one behind the other along the coating booth, as shown in FIG. 1. A slot 45 for the introduction of the spray device 41 into the chamber is provided at least between the belts 12. The slot 45 is tightly closed off laterally by sealing elements 46. The sealing elements 46 can be fastened to the grounded plates 32, and the elements are preferably of plastic since plastic tends to repel the coating powder. As a result of the repulsion of the plastic and due to the air which flows through the slot due to the partial vacuum within the chamber, this part of the coating chamber is kept relatively clean.

The slot-limiting elements 46 can have the form of bow-shaped springs, as shown in FIG. 5. However, they can also have the form of rails like the plastic elements 47 in FIG. 6. Spring-like elements 46 have the advantage that they apply themselves tightly against the spray device 41. In the case of rail-like elements 47, on the other hand, the seal can only be improved if they form a sort of labyrinth packing together with the spray device 41.

In the embodiment of the invention shown in FIG. 7, there are separate filter belts 51 and 52 for the chamber longitudinal walls, 53 and 54 for the chamber roof, and there are additional filter belts 55 and 56 for the longitudinal end sides of the chamber. The coating chamber is thereby optimally closed on all sides. A change from one powder to another powder in a color change does not require any additional cleaning work. Thus, a change in color can be carried out without disturbing down time. The roof belts 53 and 54 rotate longitudinally and their lower courses rotate toward the end belts 55 and 56 to discharge powder falling on them to the end belts 55 and 56. The inner courses of the end belts 55 and 56 extend vertically up past the inner, downwardly facing courses of the roof walls 53 and 54 to help in the transfer of the coating material from the roof walls to the end belts. From the end belts, the powder comes onto the filter belt 2 on the floor of the chamber. The lateral filter belts 51 and 52 rotate so that their opposed inner courses move down and transfer their powder in the same manner to the filter belt 2 at the floor of the chamber.

For the transfer of powder from the upper belts 53 and 54 to the belts 55 and 56 arranged below them as well as for the transfer of powder from the belts 51, 52, 55 and 56 to the bottom belt 2, cleaning devices 25 and 26, such as that shown in FIG. 2, can be used. Furthermore, a powder removal device 31 corresponding to that shown in FIG. 3 can be provided for all belts. Between the sets of lateral belts 52 there are slot-like spaces 45 for the spray device 41. Between the upper belts 53 and 54, there is a slot 17 in the roof of the chamber for the suspension devices attached to a circular conveyor for the articles to be coated. With respect to other details not shown, the embodiment of FIG. 7 corresponds to that of FIGS. 1 to 6.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

What is claimed is:

1. A spray coating device for spraying particulate coating material, comprising:
   a spray chamber for containing articles to be spray coated; the chamber having a bottom;
   a discharge device located at the chamber bottom for discharging from the chamber coating material that has accumulated on the bottom of the chamber;
   the chamber being further defined by and being located inside inner walls, the inner walls being movable with respect to the chamber;
   means for moving the inner walls for causing the inner walls to move to deliver coating material that has accumulated on the inner walls to the discharge device, and at least some of the inner walls moving downwardly toward the bottom of the chamber; the inner walls comprising endless movable belts having inner courses facing inwardly into the chamber for defining the inner walls and having outer courses that pass outside the respective inner courses; each endless belt being in the form of a loop, and a grounded metal plate being positioned inside the loop of at least one of the endless belts for screening off electric fields; and
   a spray device directed to spray coating material inside the chamber for spraying an article therein, the spray device being further directed to spray coating material into the space between those of the inner walls that are moving down toward the chamber bottom.

2. The spray coating device of claim 1, further comprising wall cleaning means for cleaning the chamber inner walls.

3. The spray coating device of claim 2, wherein the cleaning means cleans the inner walls at the lower ends thereof for discharging removed coating material to the discharge device.

4. The spray coating device of either of claims 2 or 3, wherein the cleaning means for each inner wall comprises a brush.

5. The spray coating device of either of claims 2 or 3, wherein the cleaning means comprises a pressure gas blast device for gas blast cleaning the inner walls.

6. A spray coating device for spraying particulate coating material, comprising:
   a spray chamber for containing articles to be spray coated; the chamber having a bottom and having a roof opposed to the bottom, and further comprising a movable wall;
   a discharge device located at the chamber bottom for discharging from the chamber coating material that has accumulated on the bottom of the chamber; the discharge device comprising a movable floor wall extending substantially over the entire bottom of the chamber;
   the chamber being further defined by and being located inside inner walls, the inner walls being movable with respect to the chamber; each inner wall being in the form of an endless belt that is in the form of a loop, a grounded metal plate being positioned inside the loop of at least one of the endless belts for screening off electric fields;
   means for moving the inner walls for causing the inner walls to move to deliver coating material that has accumulated on the inner walls to the discharge device, at least some of the inner walls moving downwardly toward the bottom of the chamber;
   means for moving the roof in a direction for removing coating material that has accumulated on the roof from the chamber;
   floor moving means for moving the floor wall for moving outside the chamber coating material that has accumulated on the floor wall; and
   a spray device directed to spray coating material inside the chamber for spraying an article therein, the spray device being further directed to spray coating material into the space between those of the inner walls that are moving down toward the chamber bottom.

7. The spray coating device of claim 6, wherein at least one of the walls is comprised of substantially nonflammable, fabric reinforced, plastic sheeting.

8. The spray coating device of claim 6, wherein at least some of the inner walls and the floor wall comprise endless movable belts having inner courses facing inwardly into the chamber for defining the inner walls and having outer courses that pass outside the respective inner courses.

9. The spray coating device of claim 6, wherein the inner walls comprise movable belts.

10. The spray coating device of claim 9, wherein the inner walls comprise endless movable belts having inner courses facing inwardly into the chamber for defining the inner walls and having outer courses that pass outside the respective inner courses.

11. The apparatus of claim 10, further comprising wall cleaning means for cleaning the chamber inner walls.

12. The apparatus of claim 11, wherein the cleaning means cleans the inner walls at the lower ends thereof for discharging removed coating material to the discharge device.

13. The spray coating device of either of claims 1 or 6, further comprising a suction device at at least some of the inner walls for drawing off coating material.

14. The spray coating device of claim 13, wherein the suction device suctions the respective inner wall at a location approximately as the inner wall is removing coating material from the chamber.

15. A spray coating device for spraying particulate coating material, comprising:
   a spray chamber for containing articles to be spray coated; the chamber having a bottom;
   a discharge device located at the chamber bottom for discharging from the chamber coating material that has accumulated on the bottom of a chamber;
   the chamber being further defined by and being located inside inner walls, the inner walls being movable with respect to the chamber; the inner walls comprising movable belts having inner courses facing inwardly into the chamber for defining the inner walls and having outer courses that pass outside the respective inner courses;
   means for moving the inner walls for causing the inner walls to move to deliver coating material that has accumulated on the inner walls to the discharge device, at least some of the inner walls moving downwardly toward the bottom of the chamber;
   cleaning means for cleaning the chamber inner walls at the lower ends thereof for discharging removed coating material to the discharge device; the cleaning means comprising a pressure gas blast device for gas blast cleaning the inner walls, the gas blast device being angled so that the blast thereof impinges on the respective inner wall at the bottom thereof at an angle of less than 45° for forming a vacuum region between the jet of gas and the respective inner wall for entraining coating material from the inner walls by means of the Coanda effect; and
   a spray device directed to spray coating material inside the chamber for spraying an article therein, the spray device being further directed to spray coating material into the space between those of the inner walls that are moving down toward the chamber bottom.

16. The spray coating device of claim 15, wherein the angle is in the range of 5°–12°.

17. The spray coating device of any one of claims 9, 10 or 15, further comprising a guide roller for engaging at least one of the belts at the inner wall inner course thereof on which particulate material accumulated; the guide roller being surface contoured for supporting the belt inner course only over relatively small regions of the guide roller for minimizing compression of particulate material between the guide roller and the belt inner course.

18. The spray coating device of claim 17, wherein the chamber has a roof opposed to the bottom thereof and wherein the belt engaged by the guide roller is deformed around the guide roller for defining both an inner side wall and at least part of the chamber roof.

19. The spray coating device of claim 18, wherein the roof moving means moves the roof wall in a direction toward an inner wall at the side of the chamber.

20. The spray coating device of claim 19, wherein the inner wall toward which the roof moves extends taller than the inner side of the roof of the chamber.

21. The spray coating device of any one of claims 1, 6 or 15, wherein at least one of the inner walls is an air pervious, particulate material retaining filter element;
   a vacuum source communicating with and over substantially the entire width of the filter element inner wall on the surface thereof outside the surface facing into the chamber.

22. The spray coating device of claim 21, wherein it is the bottom of the chamber that is the filter element.

23. The spray coating device of claim 21, wherein at least one of the belts is comprised of substantially nonflammable, fabric reinforced, plastic sheeting.

24. The spray coating device of any one of claims 1, 6 or 15, wherein at least one of the inner walls is divided into two sections by a slot extending vertically along that inner wall; and the spray device being introduced into the chamber through the slot.

25. The spray coating device of claim 24, wherein the spray device is displaceable along the slot.

26. The spray coating device of claim 25, further comprising slot width limiting means at the slot for narrowing the width of the slot toward the spray device passing through the slot.

27. The spray coating device of claim 26, wherein the slot width limiting means comprise plastic elements at the slot for limiting its width.

28. The spray coating device of claim 27, wherein the plastic elements at the slot are rail like.

29. The spray coating device of claim 26, wherein the slot width limiting means comprise resilient plastic elements at the slot which are normally resiliently biased toward the spray device.

30. The spray coating device of either of claims 1 or 15, wherein the chamber has a roof opposed to the chamber bottom and comprising a movable wall, and means for moving the roof in a direction for removing from the chamber coating material that has accumulated on the roof; and a movable floor wall extending substantially over the entire bottom of the chamber; and floor moving means for moving the floor wall for moving outside of the chamber coating material that has accumulated on the floor wall.

* * * * *